Figure 1:
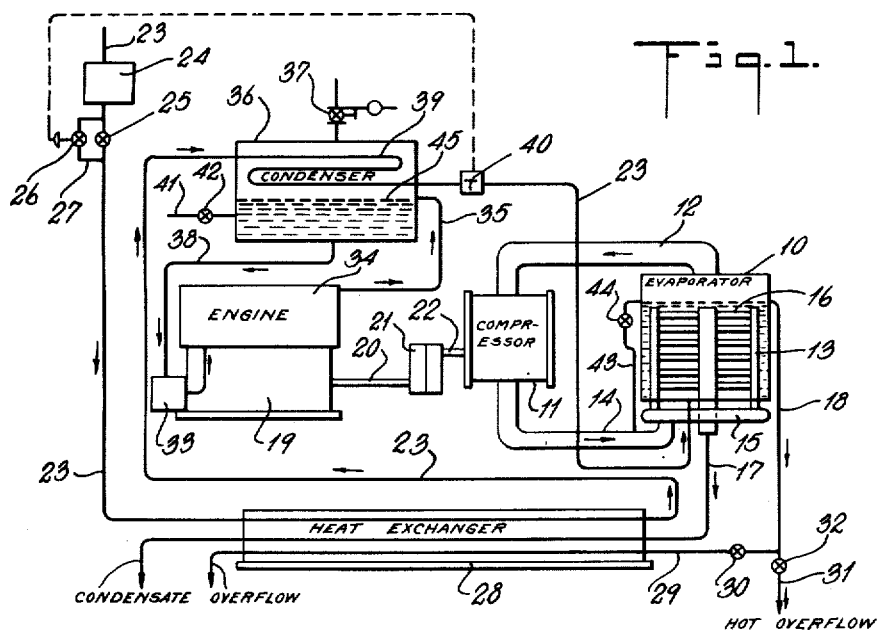

Patented Nov. 27, 1945

2,389,789

UNITED STATES PATENT OFFICE 2,389,789

DISTILLATION METHOD AND APPARATUS

Allen Latham, Jr., Jamaica Plain, Mass., assignor to Arthur D. Little, Inc., a corporation of Massachusetts Application February 10, 1943, Serial No. 475,401

5 Claims. (Cl. 202—75)

This invention relates to distillation method and apparatus. It relates particularly to distillation of the vapor-compression type wherein vapors generated in a vaporization zone are compressed until the condensing temperature thereof is above the boiling point of the solution in the vaporization zone, and then returned to the vaporization zone for condensation and giving up of heat to the solution in the vaporization zone, so that the distillation operation may be maintained.

In Patent No. 2,280,093 granted to Robert V. Kleinschmidt, a distillation method and apparatus is described wherein distillation of the vapor-compression type above mentioned is assisted by utilization of the sensible heat, derived from an internal combustion engine in cooling it to normal operating temperatures, for the purpose of preheating of fresh solution fed to the vaporization zone. It is a purpose of this invention to provide distillation method and apparatus which is an improvement upon the method and apparatus of Patent No. 2,280,093. Among the advantages of the improved method and apparatus of this invention as compared with the method and apparatus of Patent No. 2,280,093 are:

(1) The initial cost of equipment is substantially reduced through decrease in the amount of heat transfer surface required, decrease in the number of valves required for control of the system and simplification of the piping connections;

(2) Simplification of control of the distillation operation by elimination of parallel streams of feed water which must be individually as well as collectively controlled; and (3) Reduction of the energy required for pumping feed into the system.

As with the distillation method and apparatus described in said Patent No. 2,280,093, the distillation and method of the present invention is applicable to the separation of components of a fluid mixture of two or more substances by reason of their difference in boiling point or volatility. The present invention is applicable where both the initial mixture and the separated components are liquids during some portion of the operation, but these liquids may be more or less concentrated solutions of solids, liquids or gases in liquids, or liquid mixtures of materials normally in gaseous form in the pure state. The present invention is applicable to what is commonly known as distillation, fractionation, rectification, evaporation, concentration, and the like which are characterized by the evaporation of a portion of a liquid mixture. Any such liquid mixture is referred to herein as a solution, and any such operation is referred to herein as distillation, for purposes of brevity.

In the Kleinschmidt Patent No. 2,280,093, there are shown various arrangements whereby the incoming raw feed is divided into two streams, one stream being heated by out-of-contact heat exchange with hot condensate withdrawn from the condenser for compressed vapor that is located in the vaporization zone, and the other stream being heated by utilization of waste heat derived from the internal combustion engine that operates the compressor for compressing vapor withdrawn from the vaporization zone until the condensing temperature of the withdrawn vapor is above the boiling point of the solution undergoing vaporization in the vaporization zone. I have found that the method and apparatus described and shown in the Kleinschmidt Patent No. 2,280,093 may be improved with the advantages above indicated by passing the incoming raw feed into the system as a single stream which is heated successively by heating steps that are effective in series relation the one to the other, one step being the heating of the feed by out-of-contact heat exchange with hot condensate withdrawn from the vaporization zone or such hot condensate plus hot concentrated solution withdrawn from the vaporization zone, and the other step being the heating of the stream of incoming feed by the sensible heat derived from the internal combustion engine that actuates the vapor compressor. It is ordinarily preferable, but not essential, that the incoming feed be heated first by heat exchange with hot condensate derived from the vaporization zone and thereafter be heated by heat derived from the internal combustion engine. It is also a feature of preferred practice of this invention that the average temperature differential between the hot condensate and the incoming fresh solution to be distilled be maintained substantially greater than the average temperature differential in the zone wherein the incoming fresh solution is heated by heat derived from the internal combustion engine. In the practice of this invention, it is preferable but not essential that the incoming fresh solution be heated, in the step wherein the heat is derived from the internal combustion engine, by out-of-contact heat exchange with fluid which is heated by the heat derived from the internal combustion engine.

Figure 2:
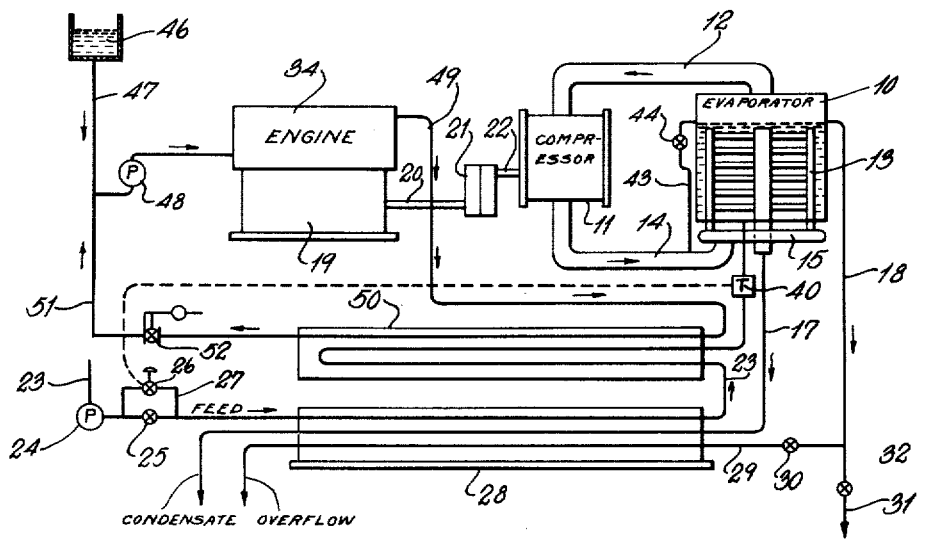
Figure 3:
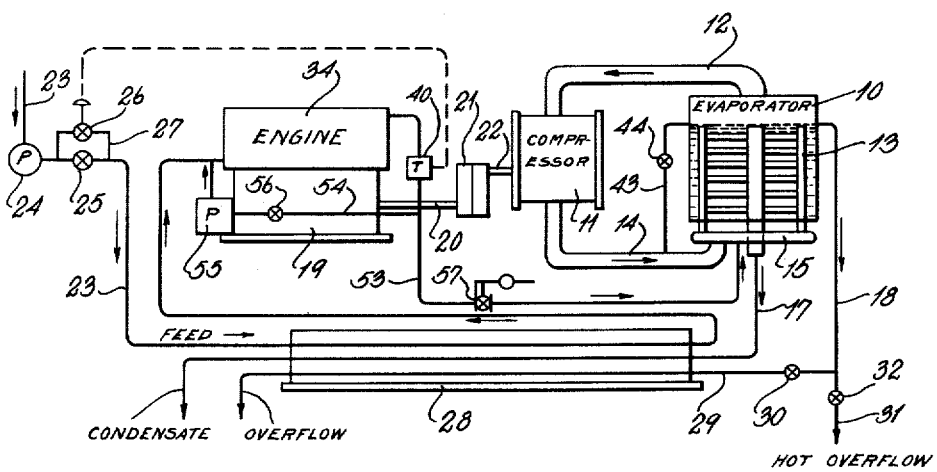

Further purposes, features and advantages of this invention will be apparent from the following description of this invention in connection with the illustrative embodiments thereof shown in the accompanying drawings, wherein Figure 1 is a side elevational schematic view of one embodiment of this invention;

Fig. 2 is a side elevational schematic view of an alternative embodiment of this invention; and Fig. 3 is a side elevational schematic view of a further alternative embodiment of this invention.

Referring to the embodiment of this invention shown in Fig. 1, the distillation unit includes a vaporization chamber 10 and a compressor 11. Vapor evolved in the vaporization chamber 10 is taken to the suction side of the compressor by the suction vapor line 12. Within the vaporization chamber 10 is a condenser heat exchange means 13 adapted to maintain a condensing vapor in out-of-contact heat exchange with solution in the vaporization chamber 10. Vapor compressed by the compressor 11 is directed to the condenser heat exchange means 13 by pressure vapor line 14. The compressed vapor in line 14 enters the header 15 and passes thence into the condenser heat exchange means wherein it condenses in the passages thereof, inasmuch as the compressor serves to raise the condensing temperature of the compressed vapor to a temperature above the boiling point of the solution in the evaporator. The passages of the condenser heat exchange means in which the vapor condenses are indicated by the reference character 16 and are shown schematically. It is apparent that any suitable type of condenser heat exchange means adapted to receive vapor and permit the condensation thereof in out-of-contact heat exchange with solution in the vaporization chamber may be used. The condensate resulting from condensation of the compressed vapors in the condenser heat exchange means flows out of the condenser heat exchange means through the line 17. Concentrated solution is withdrawn from the vaporization chamber through the line 18 and the level of the mouth of the line 18 may serve to control the normal liquid level of solution in the vaporization chamber.

The compressor is operated by an internal combustion engine 19. This engine is of any conventional type having the combustion chamber walls cooled by a fluid which circulates around them and boils in contact with them and may be a gasoline engine, a Diesel engine or the like, and for this reason the details of construction of the engine are not shown. The drive shaft 20 of the engine is connected directly or through suitable gearing 21 to the shaft 22 which actuates the compressor. If desired, a suitable clutch means, not shown, may be interposed between the drive shaft of the engine and the actuating shaft of the compressor.

The feed of solution to be distilled is introduced into the system through the line 23. The quantity of the feed that is introduced into the system may be controlled by a positive displacement pump 24 of such character that the quantity of feed introduced into the system can be controlled by the rate of operation of the pump. Suitable means, not shown, may be employed for varying the speed of the pump 24. Alternatively a constant pressure pump may be employed or a gravity feed, and the quantity of solution fed into the system may be controlled by the valve 25. Preferably, the feed is controlled by the thermostatically actuated valve 26 in line 27 which by-passes valve 25, a constant pressure in such case being maintained in the feed line 23 on the inlet side of valve 26. When valve 26 is actuated thermostatically, the valve 25 may be completely closed, although valve 25 may be wholly or partially open, the valve 26 in such case controlling the amount of feed that is introduced into the system over and above that which passes through valve 25. If desired, the thermostatic valve 26 may be omitted or cut out, the feed being controlled in such case by the pump 24 and/or valve 25.

According to this invention, the entire feed introduced into the system through line 23 is passed through the heat exchanger 28 where it is brought into out-of-contact and counterflow heat exchange relation with hot condensate discharged by line 17 from the condenser heat exchange means 13 in the vaporization zone. The overflow line 18 for removing hot concentrated solution from the vaporization chamber has a branch line 29 which is adapted to direct hot concentrated solution from the vaporization chamber 10 through the heat exchanger 28 in out-of-contact and counterflow heat exchange relation with fresh solution being fed into the system through the line 23. The line 29 is controlled by the valve 30. The hot overflow may also be discharged from the system through the line 31 controlled by the valve 32. It is apparent, therefore, that all of the overflow of hot concentrated solution can be directed through the preheater heat exchanger 28 or that all may be discharged through the line 31. Moreover, by adjusting the valves 30 and 32, any desired intermediate proportion of the overflow can be directed through the heat exchanger 28.

In the embodiment of this invention shown in Fig. 1, the internal combustion engine is of the type designed to be cooled by boiling of the engine cooling liquid, usually water, in the engine cooling passages, the engine being cooled by absorption of latent heat from the cylinder walls. As shown in Fig. 1, the engine cooling liquid is circulated by pump 33 through the cooling passages afforded by the engine jacket 34. The line 35 directs the heated fluid, which normally is a mixture of liquid and vapor, e. g., a mixture of water and steam, from the engine cooling passages to the preheater-condenser heat exchanger 36, and the vapor rises to the upper portion thereof. If desired, a safety-valve 37 may be used in connection with the exchanger 36, and, in order to replace any fluid that may escape through the safety valve 37, engine cooling liquid may be introduced into the exchanger 36 through line 41 controlled by valve 42. Liquid is taken from the exchanger 36 by line 38 to the pump 33 for recirculation through the engine cooling passages of the engine 19.

The fresh solution being fed into the system is passed through the coil 39 or other suitable means for maintaining the incoming feed in out-of-contact heat exchange relation with vapor in the exchanger 36. The feed which has been preheated in the coil 39 is then passed through the thermostat 40 which controls the action of valve 26 and is thereafter introduced into the vaporization chamber 10. In the exchanger 36, the vapors produced by heat derived from the engine are condensed by contact with the coil 39 and the liquid condensate is recirculated through the engine cooling jacket of the engine in the manner above described. While the incoming feed is heated by heat exchange with vapor, it is to be regarded that in this modification of this invention the feed is heated by out-of-contact heat exchange with fluid heated by sensible heat derived from the engine 19 in cooling the engine.

The operation of the embodiment of this invention shown in Fig. 1 is along the following lines. The fresh solution fed into the system through line 23 is first brought into contact in heat exchanger 28 with hot condensate withdrawn from the condenser heat exchange means 13 that is located in the vaporization chamber 10. The incoming solution may also be brought into out-of-contact heat exchange with any hot concentrated solution directed through line 29. Since the incoming solution is initially brought into contact with the hot condensate or hot condensate plus hot concentrated solution, each of which as withdrawn are at the boiling point of solution in the vaporization chamber, the temperature differential between the fresh solution being fed into the system and the liquid in out-of-contact heat exchange therewith is relatively great, and this is of advantage as will be illustrated more specifically hereinbelow. It is one of the features of the preferred practice of this invention that the average temperature differential between the incoming fresh solution and the hot condensate in out-of-contact heat exchange therewith is relatively large and/or is greater than the average temperature differential that is maintained in heating the feed by heat derived from the internal combustion engine. For automatic regulation, the thermostat 40 may control the rate of feed by actuating the valve 26 in a manner that is appropriate for heating the feed to adjacent the boiling point of the solution as it enters the vaporization chamber. The arrangement whereby the concentrated solution may be discharged from the system through line 31 or through line 29 or through both in any desired relative proportions affords flexibility to the system permitting considerable latitude in the relative proportions of concentrated solution and distillate withdrawn from the system while at the same time carrying on the operation so that substantially all of the vapor generated in cooling the internal combustion engine becomes condensed by contact with the coil 39 in the exchanger 36.

In order to assist in instituting the distillation, a bypass line 43 controlled by valve 44 may be provided, so that by opening the valve 44 the vapor and any gases compressed by the compressor 11 may be recirculated into the vaporization chamber until the work done by the compressor serves to heat the recirculated vapors and gases until distillation conditions are attained as described in the aforesaid Patent No. 2,280,093 as well as in Patents Nos. 2,185,595 and 2,185,596.

The advantages of the present invention may be illustrated in connection with the following specific illustration of the practice of this invention in the distillation of sea water. The feed is introduced into the system at the rate of ten pounds per minute at a temperature of 50° F. In the heat exchanger 28, the feed is heated so that as it leaves the heat exchanger 28 it is at a temperature of 161° F. Assuming that all of the concentrated solution withdrawn from the vaporization chamber 10 and the hot distillate withdrawn from the condenser heat exchanger 13 are brought into counterflow heat exchange with the incoming feed in the exchanger 28, the combined streams will total the same as the feed, namely, 10 lbs. per minute, and will enter the heat exchanger 28 at a temperature of about 220° F. and will leave the heat exchanger 28 at a temperature of about 109° F. Thus throughout the heat exchanger 28 there will be maintained a temperature differential, between the incoming feed and the streams of hot liquid in heat exchange relation therewith, of about 59° F. and the total heat exchange will be about 66,600 B. t. u. per hour. If the heat exchanger 28 is designed to move the liquids passing therethrough at a relatively low velocity, e. g., ½ ft. per second or less, the coefficient of heat transfer for the liquid-to-liquid heat exchange will be about 50 and for this coefficient of heat transfer a heat exchange surface of about 22.6 sq. ft. will be required. At high velocities of the streams of liquid in heat exchange relation (e. g., 3 to 4 ft. per second), the efficiency of the heat exchanger is greater and the coefficient of heat transfer will be about 500. For a coefficient of heat transfer of about 500, the area of the heat exchange surface that is required in heat exchanger 28 will be about 2.26 sq. ft.

In the exchanger 36, the feed in coil 39 is in heat exchange relation with steam (at 212° F.) above the liquid level 45 that is maintained in this exchanger. The feed at the rate of 10 lbs. per minute enters the exchanger 36 at substantially the same temperature that it left exchanger 28, namely, at about 161° F. In the heat exchanger 36, it is heated to about 200° F. and flows from this heat exchanger to the vaporization chamber 10 at this temperature. When the feed enters the heat exchanger 36, the temperature differential therefore is about 51° F. and as the feed leaves the heat exchanger the temperature differential is about 12° F., the average temperature differential in heat exchanger 36 being about 27° F. The heat exchange in heat exchanger 36 is about 23,400 B. t. u. per hour. Assuming that the feed flows through the coil 29 at a relatively low velocity (about ½ ft. per second or less), the coefficient of heat transfer (condensing liquid to vapor) will be about 100 and for this coefficient of heat transfer a heat exchange surface of about 8.66 sq. ft. will be required. If high velocity is maintained in coil 29 (e. g., 3 to 4 ft. per second), the coefficient of heat transfer will be about 500 and the heat exchange surface that will be required is about 1.73 sq. ft.

The foregoing may be compared with an operation wherein the incoming feed is split into two streams, as set forth in Patent No. 2,280,093, one stream of feed being heated to about 200° F. by counterflow liquid-to-liquid heat exchange with all of the hot concentrated solution and the hot distillate taken from the vaporization chamber, the other stream being heated to about 200° F. by heat exchange with steam in a liquid-vapor heat exchanger, the steam being derived as a result of cooling the internal combustion engine that operates the compressor. In such an operation, the total feed, for purposes of comparison with the above-described operation according to the present invention is taken as 10 lbs. per minute and is at an initial temperature of 50° F. In order to receive 66,600 B. t. u. per minute from the hot distillate and the hot concentrated solution, one stream of the feed is flowed at the rate of 7.4 lbs. per minute in counterflow heat exchange relation with the hot concentrated solution and hot distillate that are taken at a temperature of 220° F. from the vaporization zone, at the rate of 10 lbs. per minute. These streams leave the liquid-to-liquid exchanger at a temperature of 109° F. Therefore, the temperature differential when the feed enters this heat exchanger is 59° F. and is 20° F. when the feed leaves the exchanger, the average temperature differential being 36° F. For a low velocity heat exchanger where the coefficient of heat transfer is 50, the area of heat exchange surface required to heat this stream of feed is 37 sq. ft. For a high velocity heat exchanger wherein the coefficient of heat transfer is about 500, then the heat exchange surface that is required is 3.7 sq. ft.

As aforesaid according to Patent No. 2,280,093, the feed is divided, and, referring to the foregoing typical operation, the balance of the feed will be 2.6 lbs. per minute, and this stream of the feed is heated from 50° F. to 200° F. by heat exchange with steam at 212° F. (derived from the internal combustion engine). The total heat exchanged is 23,400 B. t. u. per minute in heating this stream. In this heat exchanger (liquid to condensing vapor), the temperature differential when the feed enters the exchanger is 162° F. and when the feed leaves the exchanger is 12° F. For a low velocity heat exchanger wherein the coefficient of heat transfer (liquid to condensing vapor) is 100, the heat transfer surface that is required is 4.06 sq. ft. For a high velocity heat exchanger wherein the coefficient of heat transfer is 500, the required area for heat exchange surface is .81 sq. ft.

In connection with the foregoing comparative operations wherein the same amount of total feed is heated to the same extent (50° F. to 200° F.), the heat absorbed from the hot distillate and from the hot concentrated solution (66,600 B. t. u. per hour) is the same in each case, and the heat derived from the internal combustion engine (23,400 B. t. u. per hour) is likewise the same in each case, it may be pointed out that, when the entire feed is heated sequentially first by heat exchange with the hot liquids derived from the vaporization zone and second by heat derived from the internal combustion engine, the average temperature differential in the first heat exchange step is considerably larger (59° F.) than the average temperature differential maintained in the second or liquid to condensing vapor step (27° F.). By contrast, when the feed is divided and the two streams are heated separately, the situation is considerably different, in that the average temperature differential in the heat exchanger wherein the feed is heated by hot streams taken from the vaporization zone is low, namely, 36° F. and is considerably lower than the temperature differential (57.7° F.) maintained in heating the other stream by heat exchange with condensing vapor derived from the engine.

The increase in efficiency that results from the practice of this invention may be indicated in the following way. When all of the feed is passed in series through the two exchangers at low velocity, the total heat exchange surface required for the two exchangers is about 31.2 sq. ft. By contrast, when the feed is divided into two streams which are passed in parallel arrangement through the two exchangers, the total amount of heat exchange surface required for the two exchangers about 41.1 sq. ft. Therefore, at low velocities the utilization of the parallel arrangement of heat exchangers described in Patent No. 2,280,093 requires about 30% additional heat transfer surface as compared with the practice of the present invention whereby the feed is passed in series through the two heat exchangers. When high velocities are used, thereby increasing the coefficient of heat transfer by reducing the resistance of liquid films to heat transference, the total heat exchange area required according to the present invention by both heat exchangers arranged in series is 3.9 sq. ft., whereas, when the heat exchangers are arranged in parallel, the total heat exchange area for the two heat exchangers is 4.5 sq. ft. Thus the parallel arrangement, even when high velocities are maintained in the heat exchangers, requires over 15% of additional heat exchange surface as compared with the practice of the present invention with the heat exchangers arranged in series. Summarizing the foregoing, and taking into consideration possible differences in velocities of liquid streams in the heat exchangers, the passing of the incoming feed sequentially through the heat exchangers arranged in series results in a saving of from 15% to 30% in the area of the heat exchange surface required for the heat exchangers. And, since for any liquid velocity the amount of energy required for pumping the feed through the exchangers is approximately proportional to the amount of heat exchange area in the exchangers, the practice of the present invention results in a saving of from 15 to 30% in pumping energy that is required to impel the feed liquid through the exchangers. Furthermore, since in the practice of this invention the feed is passed in a single circuit through the exchangers arranged in series, the piping arrangement is considerably simpler than when the exchangers are arranged in parallel. Moreover, only the simplest type of feed control valve is required as compared with the more complicated control means that is required when the feed is divided into two streams which have to be individually and collectively controlled.

Somewhat more generally, it is of advantage as aforesaid to maintain in preferred practice of this invention a large temperature differential in the heat exchange step wherein the fresh solution is heated by heat exchange with hot distillate withdrawn from the vaporization zone. The average temperature differential that is maintained in this heat exchange step in good practice is at least about 30° F., e. g., in the distillation of sea water. As aforesaid, the series arrangement of the exchangers permits this large temperature differential to be maintained in the exchanger where the feed is in heat exchange relation with the hot distillate or hot distillate plus hot concentrated solution. Moreover, in operations wherein the incoming feed is heated sequentially by heat exchange with hot distillate from the vaporization zone and by heat exchange with fluid that is heated by heat derived from an internal combustion engine, the average temperature differential maintained between the feed and the hot distillate is, in good practice, greater than (and in preferred practice is at least 10° F. greater than) the average temperature differential maintained between the feed and the fluid heated by heat derived from the internal combustion engine.

The foregoing has to do primarily with the operation and advantages resulting from the means and method employed according to this invention for preheating incoming fresh solution before the solution is introduced into the vaporization chamber. As to the evaporation step, this step is of the vapor-compression type. For example, referring to Fig. 1, vapor evaporated from the solution in vaporization chamber 10 is directed to the compressor 11 where it is compressed until its condensing temperature is above the boiling point of the solution in the vaporization chamber and the compressed vapor is directed to the condenser heat exchanger 13 where it condenses. The energy introduced into the system by the compressor is sufficient so that the heat liberated as a result of condensation of the compressed vapors will complete the heating of the incoming solution to its boiling point and also vaporize as great a proportion of the solution as may be desired, the residual concentrated solution being discharged from the vaporization zone through the line 18. As aforesaid, the mechanical energy introduced into the system by the action of the compressor is supplied by the internal combustion engine which in turn receives its energy from the fuel supplied thereto. The heat that is derived from the operation of the internal combustion engine and that is ordinarily wasted is utilized to preheat the incoming solution, and this heat is supplied to the incoming solution in the special way hereinabove described and with resultant improved efficiency, economies, and advantages herein set forth.

Referring to Fig. 2, the vaporization chamber 10, the compressor 11, and the engine 19 may be the same as previously described in connection with Fig. 1. Also the vapor lines 12 and 14, the condenser heat exchange means 13, the header 15, the shafts 20 and 22 and the transmission gearing 21 may be the same. As in Fig. 1, the condensate flows out of the condenser heat exchange means through the line 17 and the overflow of concentrated solution is discharged through the line 18. The vapor bypass line 43 controlled by valve 44 may likewise be as in Fig. 1.

In practicing the invention in connection with the means shown in Fig. 2, the incoming feed is first heated by counterflow heat exchange with hot distillate or hot distillate plus hot concentrated solution coming from the vaporization zone and thereafter is heated by heat derived from the internal combustion engine; but instead of this heat being supplied in a heat exchanger of the liquid-to-condensing vapor type as in Fig. 1, the heat is supplied in a heat exchanger of the liquid-to-liquid type. The means shown in Fig. 2 is particularly advantageous when the engine is cooled with water and it is desired to maintain the temperature of the cooling liquid below the boiling point of water. It is also particularly advantageous when it is desired to employ for the engine cooling liquid some desirable liquid material having a boiling point higher than that of water which is not vaporized in performing its function as an engine cooling liquid.

The arrangement whereby the incoming feed is initially heated by heat exchange with hot distillate or with hot distillate plus hot concentrated solution may conveniently be that shown and described in connection with Fig. 1, namely, the feed line 23, the pump 24, the valve 25, the bypass line 27 containing valve 26 actuated by thermostat 46, the heat exchanger 28 and the alternative lines 29 and 31 controlled respectively by valves 30 and 32 that control the disposition of hot concentrated solution removed from the system.

The engine cooling liquid from supply tank 46 is in communication by line 47 with pump 48 which pumps the engine cooling liquid through the engine cooling passages within the cooling jacket 34 of the engine where it receives heat that results from operation of the engine to actuate the compressor. The heated engine cooling liquid is directed from engine cooling jacket 34 by line 49 to the liquid-to-liquid heat exchanger 50 where it is brought into out-of-contact heat exchange relation with feed flowing through feed line 23 that has been partially preheated in heat exchanger 28. The engine cooling liquid after having been cooled in exchanger 50 is then directed by line 51 back to the pump 48 to be recirculated through the engine. If desired, a pressure-reduction valve 52 may be employed in line 51 in order to maintain the engine cooling liquid between the pressure-reduction valve 52 and the pump 48 under superatmospheric pressure, thereby inhibiting any tendency of the engine cooling liquid to boil in the cooling passages of the engine.

The operation and advantages of the means and method shown in Fig. 2, whereby the feed is passed in series arrangement through heat exchangers 28 and 50 are of the nature hereinabove set forth in detail in connection with the operation of the embodiment shown in Fig. 1.

Referring to Fig. 3, the vaporization chamber 10, the compressor 11 and the engine 19 may conveniently be the same as previously described in connection with Figs. 1 and 2. Also, the vapor lines 12 and 14, the condenser heat exchange means 13, the header 15, the shafts 20 and 22, and the transmission gearing 21 may be the same. As in Figs. 1 and 2, the condensate flows out of the condenser heat exchange means through the line 17 and the overflow of concentrated solution is discharged through the line 18. The vapor bypass line 43 controlled by the valve 44 may likewise be the same.

In practising the invention in connection with the means shown in Fig. 3, the incoming feed is first heated by counterflow heat exchange with hot distillate or hot distillate plus hot concentrated solution coming from the vaporization zone and thereafter is heated by passing the feed directly through the engine-cooling passages of the internal combustion engine that actuates the compressor. The arrangement shown in Fig. 3, whereby the incoming feed is partially preheated by passing it directly through the engine-cooling passages of the internal combustion engine, is regarded as less desirable than the embodiments of this invention which are shown in Figs. 1 and 2 and which have been described hereinabove. It is distinctly preferable in the practice of this invention to heat the incoming feed by heat exchange with fluid, either in liquid or vapor form, which is heated by heat derived from the internal combustion engine in maintaining the internal combustion engine at normal operating temperature. When the feed is passed directly through the engine-cooling passages of the internal combustion engine, there is likelihood of formation of scale or other deposits from the incoming solution. Moreover, upon shutting down the distillation operation, the residual heat of the internal combustion engine is likely to excessively boil the incoming solution that remains in the engine-cooling passages associated with the engine. However, for certain applications, it is possible to utilize the arrangement shown in Fig. 3 and the arrangement shown in this figure represents an alternative method and means for practising this invention.

The arrangement whereby the incoming feed is initially heated by heat exchange with hot dissolution may conveniently be that shown and described in connection with Figs. 1 and 2, namely, the feed line 23, the pump 24, the valve 25, the bypass line 27 controlled by valve 26 that is actuated by thermostat 40, the heat exchanger 28, and the alternative lines 29 and 31 controlled respectively by valves 30 and 32 that control the disposition of hot concentrated solution removed from the system.

The incoming feed in line 23 after having been partially preheated in the heat exchanger 28 is passed directly into the cooling passages of the engine-cooling jacket 34 that is associated with the internal combustion engine and the feed is brought up adjacent the boiling point of the solution before it leaves the engine-cooling jacket by the line 53. In order to maintain a rapid circulation of the feed through the engine-cooling passages, a bypass line 54 preferably is provided through which the solution can be pumped by the pump 55 so as to maintain a vigorous circulation of the solution through the engine-cooling passages. The rate of flow through the bypass line 54 may be controlled by the valve 56. If desired, a pressure-reduction valve 57 may be provided in the line 53 so that the solution being fed into the system may be maintained under superatmospheric pressure between the pressure-reduction valve 57 and the pump 24, thereby inhibiting the tendency of the solution to boil while in the engine-cooling passages within the engine-cooling jacket 34 of the internal combustion engine.

The operation and advantages of the means and method shown in Fig. 3, whereby the incoming solution that is being fed into the system is passed in series through the heat exchanger 28 and thence through the engine-cooling passages so as to be further heated by heat derived from the internal combustion engine, are of the nature hereinabove set forth in detail, particularly in connection with the arrangement shown in Fig. 1.

While this invention has been described in connection with certain illustrative embodiments thereof and in connection with certain typical distillation methods, it is apparent that other arrangements are possible within the scope of this invention. For example, instead of passing the feed in series arrangement so as to be heated first by heat exchange with hot distillate or with hot distillate plus hot concentrated solution and then by heat derived from the internal combustion engine that actuates the compressor, it is possible, while still preserving the series arrangement according to the present invention, to reverse the sequence of heating steps so that the incoming feed may be heated first by heat derived from the internal combustion engine and thereafter by heat exchange with hot condensate or with hot condensate plus hot concentrated solution removed from the vaporization zone. Such an operation would be particularly advantageous in the event that the evaporator, instead of being used to evaporate an aqueous solution that has a boiling point in the neighborhood of the boiling point of water, e. g., sea water, is used to effect distillation of a solution, aqueous or non-aqueous, having a much higher boiling point. In such case, the heat derived from the internal combustion engine, which usually operates so that the liquid in the engine-cooling passages is in the neighborhood of the boiling point of water, would only serve to partially preheat the fresh solution being fed into the system and it would become desirable to utilize the hot distillate or the hot distillate plus hot concentrated solution which is being removed from the vaporization zone at a temperature considerably above 212° F. to complete the preheating of the incoming solution to a temperature adjacent the boiling point of the solution in the vaporization zone.

Another modification of this invention consists in dividing the supply of hot distillate or hot distillate plus hot concentrated solution taken from the vaporization zone into two portions, one portion being utilized to partially preheat the incoming fresh solution before the incoming fresh solution is heated by heat derived from the internal combustion engine and then utilizing the other portion of hot distillate or hot distillate plus hot concentrated solution to effect preheating of the incoming fresh solution after the incoming fresh solution has been heated by heat derived from the internal combustion engine as by any of the ways shown in Figs. 1, 2 and 3. In such an arrangement, the steps whereby the feed is preheated would be conducted sequentially so that the heat exchange means would be arranged in series in order to obtain the improved efficiency and advantages that have been described and illustrated hereinabove.

The alternative methods and means referred to are particularly advantageous when, as aforesaid, the solution undergoing distillation has a boiling point considerably higher than the boiling point of water. While the alternative arrangements and methods which have been mentioned constitute possible ways for practising this invention and may be advantageous under certain circumstances, it is usually preferable to arrange the sequence for preheating the incoming fresh solution so that the incoming fresh solution is heated first by heat exchange with the hot distillate or hot distillate plus hot concentrated solution and thereafter is heated by heat derived from the internal combustion engine, as shown in Figs. 1, 2 and 3 and described hereinabove, inasmuch as this sequence in the preheating of the incoming solution affords optimum efficiency due to the fact that the temperature differentials are kept largest where the heat transfer conditions are poorest.

In carrying out a distillation operation in the practice of this invention, the hot distillate that is withdrawn from the vaporization zone is used to heat the incoming feed and it is optional whether all, part, or none of the hot concentrated solution withdrawn from the vaporization zone is also availed of in preheating the incoming feed. Consequently, in the claims where reference is made to heating the incoming feed by heat exchange with hot distillate, it is to be understood that this heat exchange may be afforded by the hot distillate alone or may be afforded by the hot distillate plus all or part of the hot concentrated solution.

The heat exchange means whereby the feed is heated by hot distillate (or by hot distillate plus hot concentrated solution) or whereby the feed is heated by heat derived from the internal combustion engine may be of any suitable type of which several are well known. Moreover, and more generally, it is to be understood that the means and methods hereinabove shown and described have been shown and described for illustrative purposes only, and that the means and methods of this invention may be varied within the scope of this invention as defined by the following claims.

I claim:

1. In a method of distillation wherein vapor is evolved from a solution in a vaporization zone, the evolved vapor is compressed by a compressor to a pressure at which the condensing temperature is substantially above the boiling point of the solution, compressed vapor is condensed in out-of-contact heat exchange relation with said solution in said vaporization zone, hot condensate is withdrawn from said vaporization zone, fresh solution to be distilled is introduced into said vaporization zone, and power for operating said compressor is supplied by an internal combustion engine, the steps comprising heating the fresh solution introduced into said vaporization zone sequentially and in series relation (a) in a heat exchange zone wherein said fresh solution is heated by contact with a surface heated by hot condensate withdrawn from said vaporization zone and (b) in a heat exchange zone wherein said fresh solution is heated by contact with a surface supplied with heat derived from said internal combustion engine in cooling same, the heat supplied to said incoming solution in zone (a) being greater than the heat supplied to the incoming solution in zone (b), and the average temperature differential maintained in zone (a) being at least 30° F.

2. In a method of distillation wherein vapor is evolved from a solution in a vaporization zone, the evolved vapor is compressed by a compressor to a pressure at which the condensing temperature is substantially above the boiling point of the solution, compressed vapor is condensed in out-of-contact heat exchange relation with said solution in said vaporization zone, hot condensate is withdrawn from said vaporization zone, hot concentrated solution is withdrawn from said vaporization zone, fresh solution to be distilled is introduced into said vaporization zone, and power for operating said compressor is supplied by an internal combustion engine, the steps comprising heating the fresh solution introduced into the vaporization zone sequentially and in series relation (a) in a heat exchange zone wherein said fresh solution is heated by out-of-contact counterflow heat exchange with hot condensate withdrawn from the vaporization zone and (b) in a heat exchange zone wherein said fresh solution is heated by out-of-contact heat exchange with fluid heated by heat derived from said internal combustion engine in cooling same, the heat supplied to the incoming solution in zone (a) being greater than the heat supplied to said incoming solution in zone (b) and the average temperature differential maintained in zone (a) being greater than the average temperature differential maintained in zone (b).

3. In the method according to claim 2, the steps recited in said claim wherein the heating of said incoming solution in zone (a) occurs prior to the heating of said incoming solution in zone (b), and wherein said incoming solution is heated in zone (a) not only by out-of-contact counterflow heat exchange with hot distillate withdrawn from the vaporization zone but also by out-of-contact counterflow heat exchange with hot concentrated solution withdrawn from the vaporization zone.

4. In a method of distillation wherein vapor is evolved from a solution in a vaporization zone, the evolved vapor is compressed by a compressor to a pressure at which the condensing temperature is substantially above the boiling point of the solution, compressed vapor is condensed in out-of-contact heat exchange relation with said solution in said vaporization zone, hot condensate is withdrawn from said vaporization zone, hot concentrated solution is withdrawn from said vaporization zone, fresh solution to be distilled is introduced into said vaporization zone, and power for operating said compressor is supplied by an internal combustion engine, the steps comprising first heating the fresh solution introduced into said vaporization zone by out-of-contact heat exchange with hot condensate withdrawn from said vaporization zone to partially heat said fresh solution, and, second, further heating said fresh solution introduced into said vaporization zone by out-of-contact heat exchange with fluid heated by sensible heat derived from said internal combustion engine in cooling same, said first and second steps occurring in series with said second step following said first step, and the average temperature differential maintained in said first step being greater than the average temperature differential maintained in said second step.

5. In the method according to claim 4, the steps recited in said claim, said fresh solution introduced into said vaporization zone being heated in said second heating step by heat exchange with vapor generated by boiling the engine-cooling liquid in withdrawing sensible heat from said engine to cool same.

ALLEN LATHAM, JR.

---

CERTIFICATE OF CORRECTION.

Patent No. 2,389,789.    November 27, 1945.

ALLEN LATHAM, JR.

It is hereby certified that error appears in the printed specification of the above numbered patent requiring correction as follows: Page 5, second column, line 73, strike out the words and syllable "solution may conveniently be that shown and de-" and insert the same after "concentrated" in line 74, same page and column; and that the said Letters Patent should be read with this correction therein that the same may conform to the record of the case in the Patent Office.

Signed and sealed this 5th day of March, A. D. 1946.

Leslie Frazer (Seal)    First Assistant Commissioner of Patents.

the evolved vapor is compressed by a compressor to a pressure at which the condensing temperature is substantially above the boiling point of the solution, compressed vapor is condensed in out-of-contact heat exchange relation with said solution in said vaporization zone, hot condensate is withdrawn from said vaporization zone, fresh solution to be distilled is introduced into said vaporization zone, and power for operating said compressor is supplied by an internal combustion engine, the steps comprising heating the fresh solution introduced into said vaporization zone sequentially and in series relation (a) in a heat exchange zone wherein said fresh solution is heated by contact with a surface heated by hot condensate withdrawn from said vaporization zone and (b) in a heat exchange zone wherein said fresh solution is heated by contact with a surface supplied with heat derived from said internal combustion engine in cooling same, the heat supplied to said incoming solution in zone (a) being greater than the heat supplied to the incoming solution in zone (b), and the average temperature differential maintained in zone (a) being at least 30° F.

2. In a method of distillation wherein vapor is evolved from a solution in a vaporization zone, the evolved vapor is compressed by a compressor to a pressure at which the condensing temperature is substantially above the boiling point of the solution, compressed vapor is condensed in out-of-contact heat exchange relation with said solution in said vaporization zone, hot condensate is withdrawn from said vaporization zone, hot concentrated solution is withdrawn from said vaporization zone, fresh solution to be distilled is introduced into said vaporization zone, and power for operating said compressor is supplied by an internal combustion engine, the steps comprising heating the fresh solution introduced into the vaporization zone sequentially and in series relation (a) in a heat exchange zone wherein said fresh solution is heated by out-of-contact counterflow heat exchange with hot condensate withdrawn from the vaporization zone and (b) in a heat exchange zone wherein said fresh solution is heated by out-of-contact heat exchange with fluid heated by heat derived from said internal combustion engine in cooling same, the heat supplied to the incoming solution in zone (a) being greater than the heat supplied to said incoming solution in zone (b) and the average temperature differential maintained in zone (a) being greater than the average temperature differential maintained in zone (b).

3. In the method according to claim 2, the steps recited in said claim wherein the heating of said incoming solution in zone (a) occurs prior to the heating of said incoming solution in zone (b), and wherein said incoming solution is heated in zone (a) not only by out-of-contact counterflow heat exchange with hot distillate withdrawn from the vaporization zone but also by out-of-contact counterflow heat exchange with hot concentrated solution withdrawn from the vaporization zone.

4. In a method of distillation wherein vapor is evolved from a solution in a vaporization zone, the evolved vapor is compressed by a compressor to a pressure at which the condensing temperature is substantially above the boiling point of the solution, compressed vapor is condensed in out-of-contact heat exchange relation with said solution in said vaporization zone, hot condensate is withdrawn from said vaporization zone, hot concentrated solution is withdrawn from said vaporization zone, fresh solution to be distilled is introduced into said vaporization zone, and power for operating said compressor is supplied by an internal combustion engine, the steps comprising first heating the fresh solution introduced into said vaporization zone by out-of-contact heat exchange with hot condensate withdrawn from said vaporization zone to partially heat said fresh solution, and, second, further heating said fresh solution introduced into said vaporization zone by out-of-contact heat exchange with fluid heated by sensible heat derived from said internal combustion engine in cooling same, said first and second steps occurring in series with said second step following said first step, and the average temperature differential maintained in said first step being greater than the average temperature differential maintained in said second step.

5. In the method according to claim 4, the steps recited in said claim, said fresh solution introduced into said vaporization zone being heated in said second heating step by heat exchange with vapor generated by boiling the engine-cooling liquid in withdrawing sensible heat from said engine to cool same.

ALLEN LATHAM, JR.

CERTIFICATE OF CORRECTION.

Patent No. 2,389,789.  November 27, 1945.

ALLEN LATHAM, JR.

It is hereby certified that error appears in the printed specification of the above numbered patent requiring correction as follows: Page 5, second column, line 73, strike out the words and syllable "solution may conveniently be that shown and de-" and insert the same after "concentrated" in line 74, same page and column; and that the said Letters Patent should be read with this correction therein that the same may conform to the record of the case in the Patent Office.

Signed and sealed this 5th day of March, A. D. 1946.

Leslie Frazer (Seal)  First Assistant Commissioner of Patents.